(12) United States Patent
Hilker et al.

(10) Patent No.: US 8,109,174 B2
(45) Date of Patent: Feb. 7, 2012

(54) DIFFERENTIAL COVER PROVIDING LUBRICANT FLOW CONTROL

(75) Inventors: Gregory J Hilker, Canton, MI (US); Kevin R Beutler, Columbiaville, MI (US); Kirk A Broome, Clawson, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 742 days.

(21) Appl. No.: 12/196,708

(22) Filed: Aug. 22, 2008

(65) Prior Publication Data

US 2010/0043594 A1 Feb. 25, 2010

(51) Int. Cl.
F16H 57/04 (2010.01)

(52) U.S. Cl. ....... 74/606 A; 74/606 R; 74/607; 475/160; 184/6.12

(58) Field of Classification Search ................ 74/606 R, 74/607, 606 A, 467; 475/160; 184/6.12, 184/11.1, 6.22, 104.1
See application file for complete search history.

(56) References Cited

U.S. PATENT DOCUMENTS

| | | | |
|---|---|---|---|
| 1,365,438 A | | 1/1921 | Adamson |
| 2,015,108 A | | 9/1935 | Harper |
| 2,018,188 A | | 10/1935 | Padgett et al. |
| 2,053,929 A | * | 9/1936 | Wiedmaier ............ 475/204 |
| 2,930,448 A | * | 3/1960 | Burnham ............... 184/11.1 |
| 3,138,222 A | | 6/1964 | Dames |
| 3,838,751 A | * | 10/1974 | Brown ................. 184/6.12 |
| 4,018,097 A | * | 4/1977 | Ross ..................... 74/467 |
| 4,234,120 A | | 11/1980 | Pringle |
| 4,244,242 A | | 1/1981 | Uno et al. |
| 4,261,219 A | | 4/1981 | Suzuki et al. |
| 5,245,891 A | | 9/1993 | Marich et al. |
| 6,135,241 A | | 10/2000 | Ganguly et al. |
| 6,267,203 B1 | * | 7/2001 | Brissette et al. ......... 184/6.12 |
| 6,997,238 B1 | | 2/2006 | Ruthy et al. |
| 6,997,284 B1 | | 2/2006 | Nahrwold |

(Continued)

FOREIGN PATENT DOCUMENTS

GB 1115446 A 5/1968

(Continued)

OTHER PUBLICATIONS

International Search Report for International Application No. PCT/US2009/054438, dated Mar. 18, 2010.

(Continued)

*Primary Examiner* — James Pilkington
*Assistant Examiner* — Thomas Diaz
(74) *Attorney, Agent, or Firm* — Harness, Dickey & Pierce, P.L.C.

(57) ABSTRACT

An axle assembly with an axle housing assembly and a differential that is mounted in the axle housing assembly for rotation about a first axis. The axle housing assembly defines an interior cavity with a sump having a static liquid lubricant level. The axle housing assembly includes a housing structure and a cover that is coupled to the housing structure. First and second sets of ribs are coupled to the cover and extend into the interior cavity. The first and second sets of ribs are disposed on opposite sides of a ring gear associated with the differential and include a plurality of ribs. A first portion of at least one of the ribs extends below the static liquid lubricant level to thereby be immersed when a liquid lubricant fills the sump to a level that coincides with the static liquid lubricant level.

20 Claims, 5 Drawing Sheets

U.S. PATENT DOCUMENTS

| | | |
|---|---|---|
| 7,140,995 B2 | 11/2006 | Mierisch et al. |
| 2002/0134194 A1 | 9/2002 | Milio |
| 2004/0103748 A1 | 6/2004 | Milio et al. |

FOREIGN PATENT DOCUMENTS

| | | |
|---|---|---|
| JP | 2002257214 A | 9/2002 |
| JP | 2004204949 A | 7/2004 |
| JP | 2007263139 A | 10/2007 |

OTHER PUBLICATIONS

Written Opinion issued Mar. 18, 2010 in International Patent Application Serial No. PCT/US2009/054438 (4 pages).

* cited by examiner

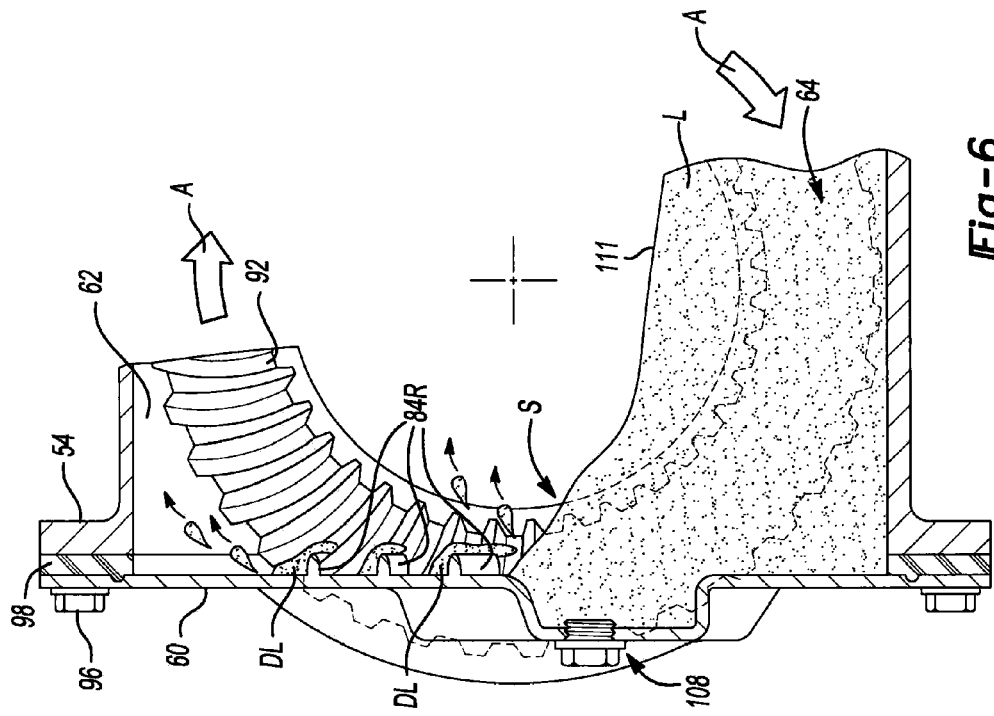
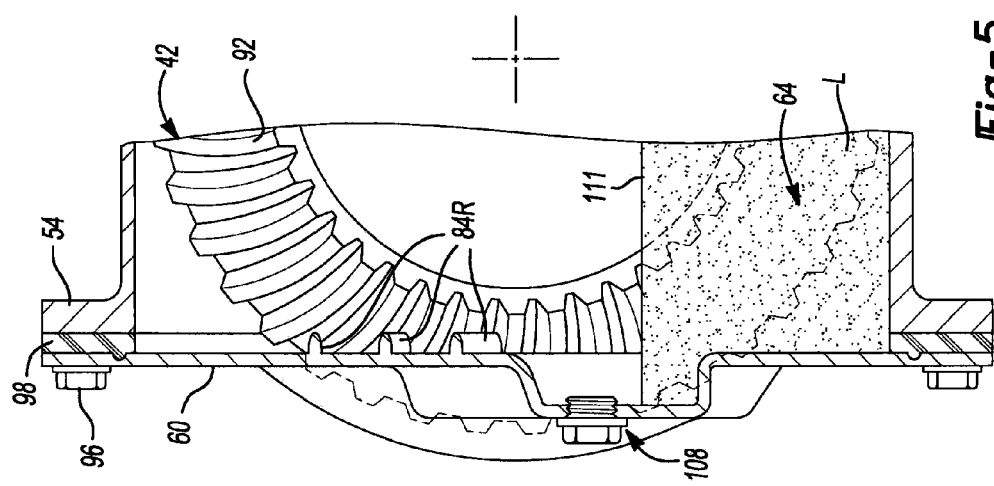

DIFFERENTIAL COVER PROVIDING LUBRICANT FLOW CONTROL

FIELD

The present disclosure relates to an axle assembly and, more particularly, to a differential assembly having a lubricant flow control arrangement disposed in an interior cavity of the differential assembly.

BACKGROUND

The statements in this section merely provide background information related to the present disclosure and may not constitute prior art.

An axle assembly for a motor vehicle includes internal moving parts that generate heat during operation of the axle assembly. It is desirable that heat generated in the axle assembly during its operation be controlled, as excessive heat could cause premature breakdown of the lubricant within the axle assembly, which in turn can reduce the life of the internal parts.

Some conventional axle assemblies employ the housing of the axle assembly to reject heat. In this regard, lubricant within the axle assembly is typically splashed by a ring gear onto the various gears within the axle assembly and heat from the gears is absorbed by the lubricant. The heated lubricant may collect in a sump, where some of the heat is transmitted to the housing. The housing can in turn reject the heat to the surrounding air, particularly the portion of the housing proximate to the sump. In addition, the heated lubricant collecting in the sump can be splashed onto the housing in areas outside of the sump. Heat from the splashed lubricant is transmitted to the housing of the axle assembly, which can then reject heat to the surrounding air.

We have found, however, that the ring gear does not always sufficiently circulate all of the lubricant in the sump, particularly the portion of the lubricant in the sump that is disposed in areas of the sump that are more distant from the ring gear, such as the portion of the lubricant near the differential side bearings. We have further found that the geometry of the various components that define the shape of the sump may inhibit fluid exchange in particular areas of the sump.

SUMMARY

The present teachings provide an axle housing assembly including a housing structure and a cover that is coupled to the housing structure. The axle housing assembly has an interior cavity with a sump that has a static liquid lubricant level. A differential is mounted in the axle housing assembly for rotation about a first axis and includes a ring gear. A first set of ribs and a second set of ribs are coupled to the axle housing assembly in the interior cavity. The first and second sets of ribs are disposed on opposite sides of the ring gear and each of the first and second sets of ribs includes a plurality of ribs. Each of the ribs has a first portion, which is disposed proximate the ring gear, and a second portion that is further from the ring gear than an associated one of the first portions. Each of the ribs extends generally upwardly and outwardly between the first and second portions. The first portion of at least one of the ribs extends below the static liquid lubricant level to thereby be immersed when a liquid lubricant fills the sump to a level that coincides with the static liquid lubricant level.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a sectional view of a portion of the axle assembly illustrating a ring gear associated with a differential in a static (non-rotating) condition;

FIG. 6 is a sectional view of a portion of the axle assembly illustrating the ring gear of the differential in a rotating condition.

DETAILED DESCRIPTION

The following description is merely exemplary in nature and is not intended to limit the present disclosure, application, or uses.

Figure 1:
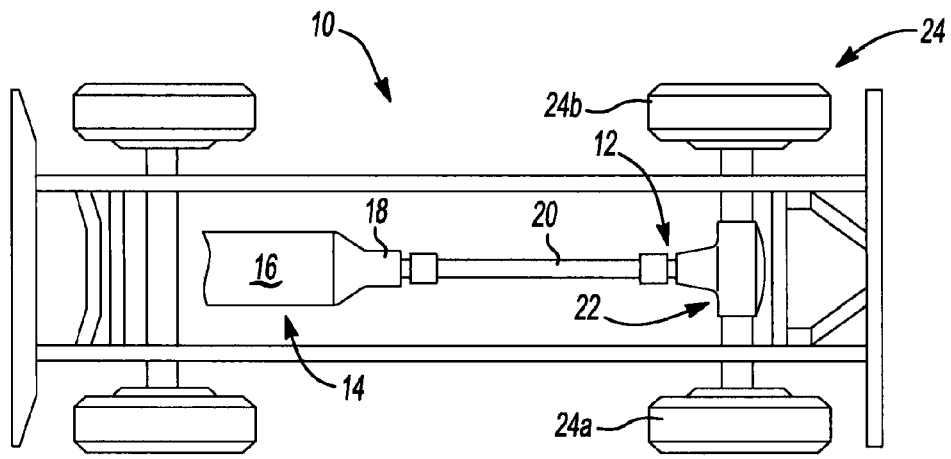
FIG. 1 is a schematic illustration of an exemplary vehicle having an axle assembly constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle 22 where it can be selectively apportioned in a predetermined manner to the left and right rear wheels 24a and 24b, respectively.

Figure 2:
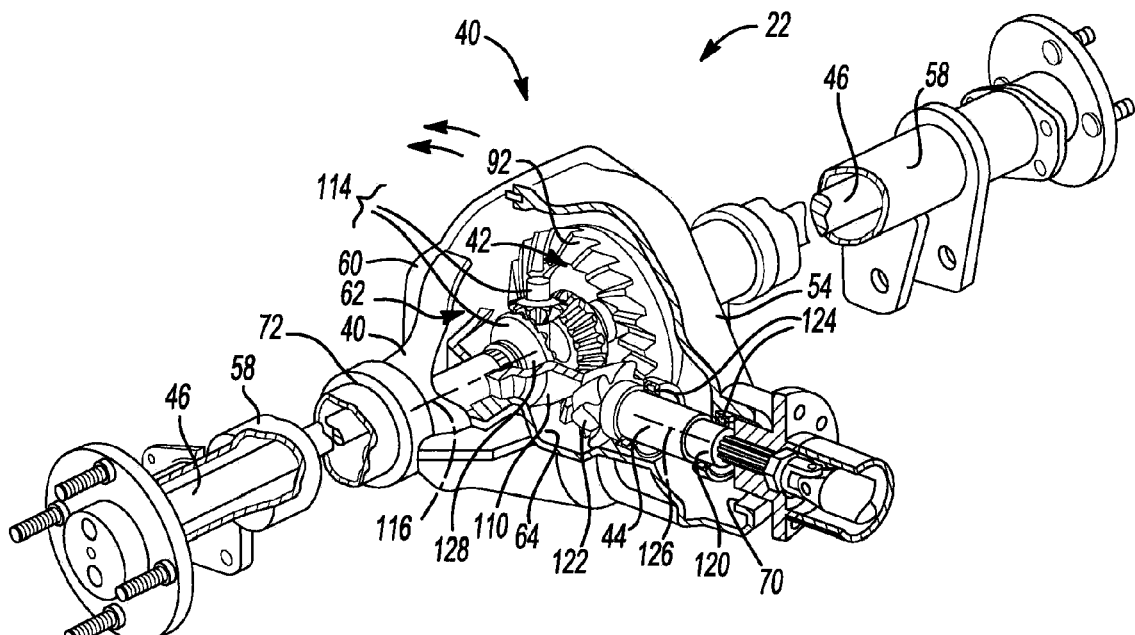
FIG. 2 is a partially broken away perspective view of a portion of the vehicle of FIG. 1 illustrating the axle assembly in more detail.
Figure 3:
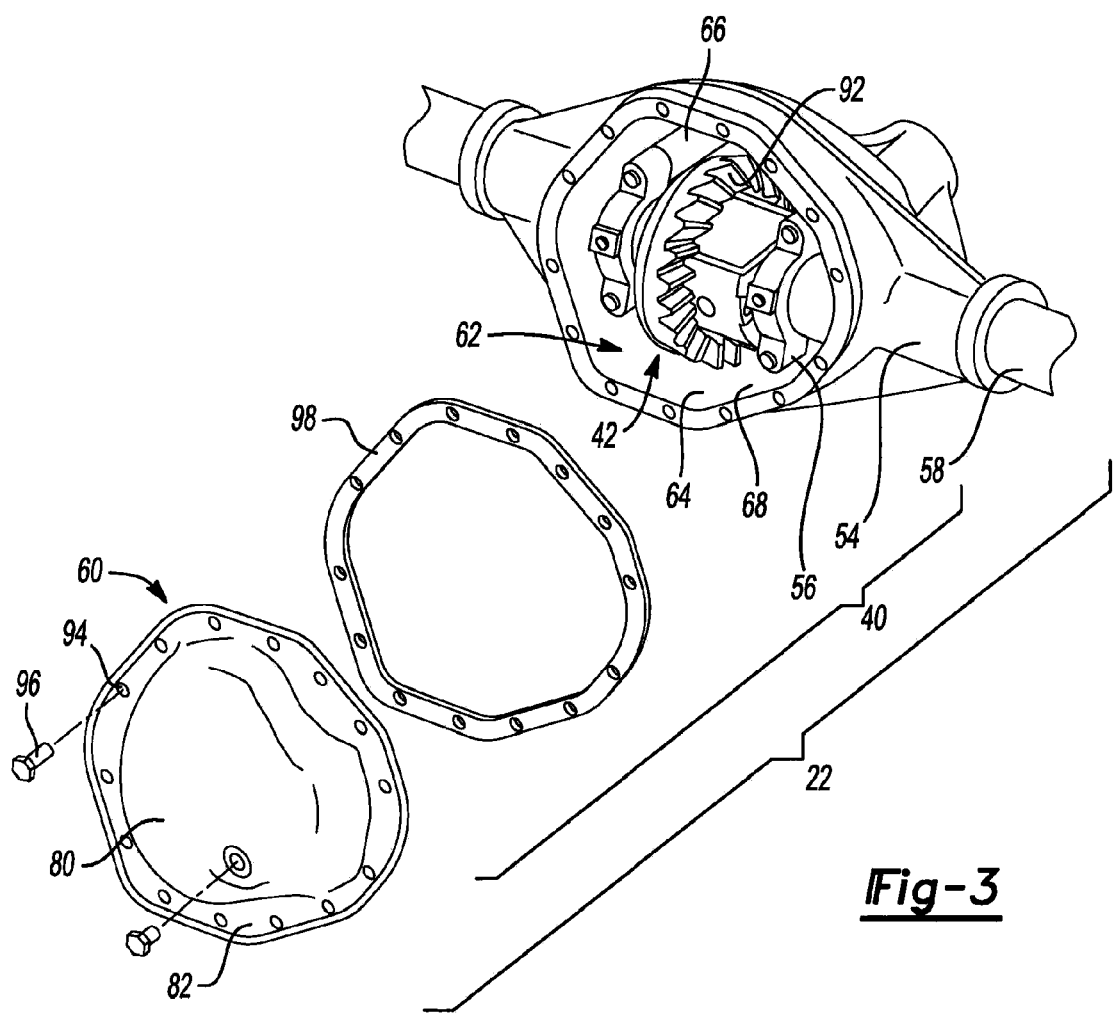
FIG. 3 is an exploded perspective view of a portion of the axle assembly.

With reference to FIGS. 2 and 3, the rear axle 22 can include an axle housing assembly 40, a differential 42, an input pinion assembly 44, and a pair of axle shafts 46.

In the particular example provided, the axle housing assembly 40 includes a carrier housing 54, a pair of bearing caps 56, a pair of axle tubes 58 and a cover 60. The axle housing 40 can define an internal cavity 62 that forms a fluid sump 64 in which a liquid lubricant (for lubricating the differential 42 and input pinion assembly 44) is located. The carrier housing 54 can include a pair of bearing journals 66, a differential aperture 68, which can be disposed on a first side of the carrier housing 54, a pinion aperture 70, which can be disposed on a second side of the carrier housing 54 opposite the differential aperture 68, and a pair of axle tube apertures 72 that can intersect the opposite lateral sides of the internal cavity 62. The bearing caps 56 can be removably coupled to the bearing journals 66. The axle tubes 58 can be received in the axle tube apertures 72 and can be fixedly coupled to the carrier housing 54.

Figure 4:
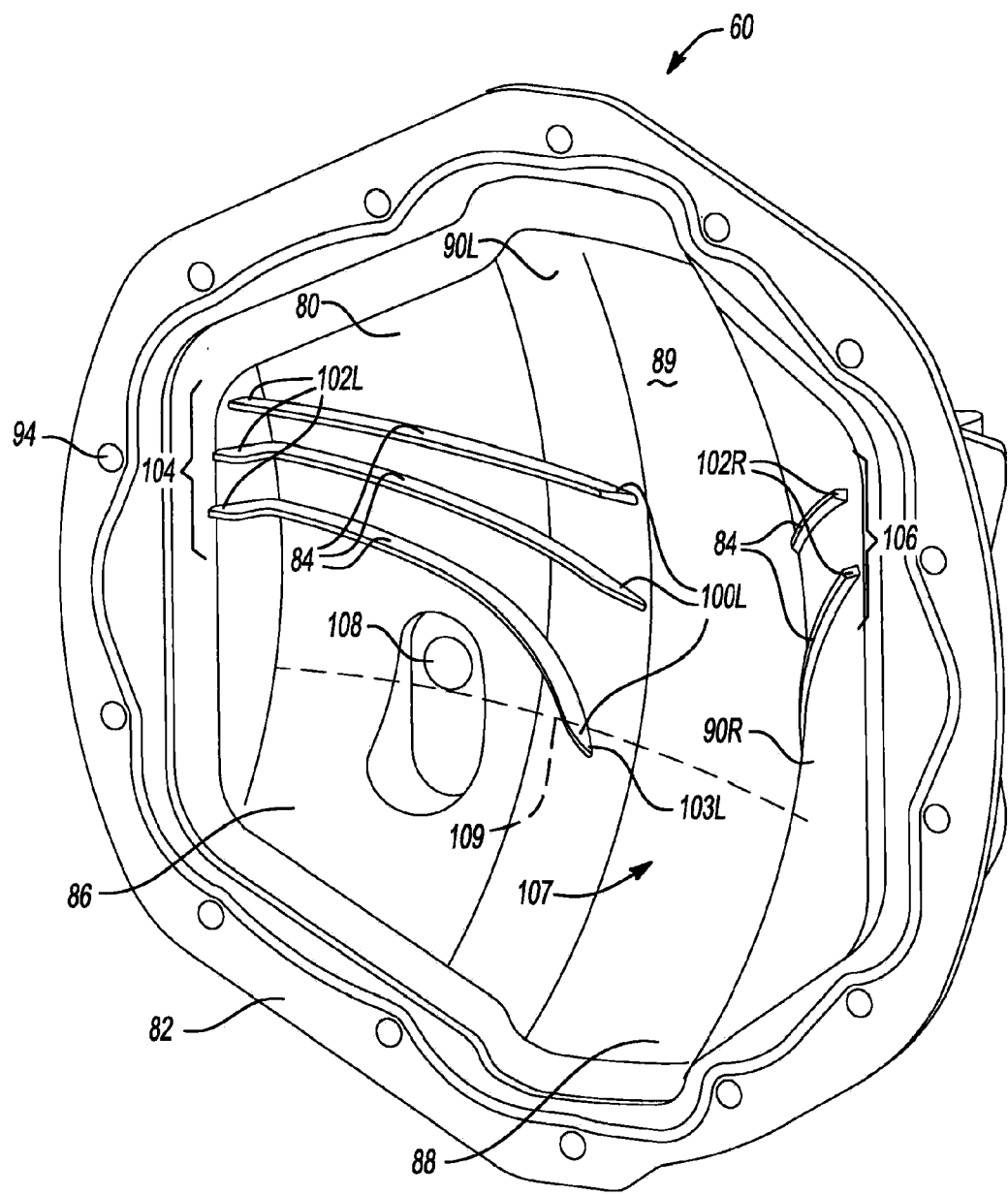
FIG. 4 is a perspective view of a cover of the axle assembly.

In FIGS. 3 and 4, the cover 60 can include a body portion 80, a flange portion 82 that can be coupled to the carrier housing 54, and a plurality of fluid deflecting ribs 84. The body portion 80 can be three-dimensionally contoured (e.g., bulged outwardly) to effectively increase the volume within the differential axle housing assembly 40 and can define an inner surface 86 having a vertically extending recess 88, which can provide clearance for a ring gear 92 that is associated with the differential 42.

The flange portion 82 can extend about the body portion 80 and, in the particular example provided, can include a plurality of through holes 94 that permit the cover 60 to be removably coupled to the carrier housing 54 (via a plurality of threaded fasteners 96). It will be appreciated that a gasket 98 or a sealant (not shown), such as a room temperature vulcanizing sealant, can be employed to seal the interface between the cover 60 and the carrier housing 54.

The recess 88 can include a bottom surface 89 having a contour that compliments a diameter of and provides clearance for the ring gear 92. For example, the recess 88 can include angled transition portions 90L and 90R that can be disposed on the left and right sides, respectively, of the ring gear 92. The angled transition portions 90L, 90R can connect the bottom surface 89 of the recess 88 with the inner surface 86 of the cover 60.

Each rib 84 can cantilever outward from the inner surface 86 of the body portion 80 and into the internal cavity 62. The ribs 84 can be integrally formed with the cover 60 (e.g., stamped into or cast on the cover 60) or formed separately (either individually or as one or more groups) and subsequently coupled to the cover 60. A first portion 100 of each rib 84 can be disposed proximate the ring gear 92 when the cover 60 is secured to the carrier housing 54. A second portion 102 of each rib 84 can terminate near the flange portion 82. Each rib 84 can extend outwardly, relative to the recess 88 (i.e., outwardly toward the flange portion 82), and upwardly along the body portion 80 from the respective first portion 100 to the respective second portion 102.

A first group 104 of ribs 84 can be disposed in a stacked relationship on one side of the recess 88, and a second group 106 of ribs 84 can be disposed in a stacked relationship on the opposite side of the recess 88. Each of the first and second groups 104, 106 can include any desired quantity of ribs 84, such as three and two, respectively, and the quantity of ribs 84 in the first group 104 can be equal to or different from (i.e., more than or less than) the quantity of the ribs 84 in the second group 106. The first and second groups 104, 106 can be laterally spaced apart to provide a fluid path 107 extending vertically along the cover 60. Hereinafter, reference numerals identifying the ribs 84 and features of the ribs 84 in the first group 104 will include the addition reference letter L (i.e., the first portion 100L) and reference numerals identifying features of the ribs 84 in the second group 106 will include the reference letter R (i.e., the first portion 100R).

With reference now to the ribs 84L (or 84R), the second portions 102L (102R) can be generally linear and can extend generally parallel to each other along the inner surface 86 toward the ring gear 92. The respective first portions 100L (100R) can be non-parallel and can diverge while extending further toward the ring gear 92. In this regard, each of the first portions 100L (100R) can be generally linear, arcuate and/or combinations thereof. Further, the first portion 100L (100R) of the lowermost rib 84L (84R) can terminate further away from the ring gear 92 than the first portions 100L (100R) of the other ribs 84L (84R) so that the first portions 100L (100R) of the ribs 84L (84R) above the lowermost rib 84L can extend further toward (e.g., progressively further toward) the ring gear 92. An end 103L (103R) of the first portion 100L (100R) of the lowermost rib 84L (84R) may extend generally acutely relative to a plane 105 extending through the ring gear 92.

In the particular embodiment shown, three ribs 84L are provided in the first group 104 having the respective second portions 102L generally evenly spaced apart and the first portions 100L disposed on the transition portion 90L. Further, progressing from the bottom to the top of the group 104, each of the second portions 102L is less arcuate (i.e., more linear) than the previous (lower) second portion 102L, wherein the uppermost rib 84L is generally linear. The first portion 100L can extend below a lubricant filling port 108 such that the respective first portion 100L extends below a static lubricant level 109. The static lubricant level 109 refers to the level of lubricant in the internal cavity 62 of the axle housing 40 in a stationary or at rest condition (see FIG. 5). Two ribs 84R are provided in the second group 106 having both the first ends 100R and the second ends 102R disposed on the transition portion 90R.

Returning to FIGS. 2 and 3, the differential 42 can be any appropriate vehicle differential and can conventionally include a case 110, the ring gear 92, which can be rotatably coupled to the case 110, and a gearset 114 that can be housed in the case 110. The differential 42 can be received into the internal cavity 62 through the differential aperture 68. The bearing journals 66 and the bearing caps 56 can cooperate to support the differential 42 for rotation in the internal cavity 62 about a first rotational axis 116.

The input pinion assembly 44 can conventionally include an input shaft 120 and an input pinion 122 that can be coupled for rotation with the input shaft 120. The input pinion assembly 44 can be received into the carrier housing 54 through the pinion aperture 70 such that the input pinion 122 is meshingly engaged to the ring gear 92. A pair of bearings 124 can be coupled to the carrier housing 54 and the input shaft 120 and can support the input pinion assembly 44 for rotation about a second rotational axis 126 that can be generally perpendicular to the first rotational axis 116. An end of the input shaft 120 opposite the input pinion 122 can be adapted to be coupled to a driveline component, such as the propshaft 20 (FIG. 1), to receive rotary power therefrom.

Each of the axle shafts 46 can be received through an associated one of the axle tubes 58 and can be coupled for rotation with an associated side gear 128 in the gearset 114 of the differential 42. Accordingly, it will be appreciated that rotary power input to the axle 22 via the input pinion assembly 44 is transmitted through the ring gear 92, to the case 110 and the gearset 114 and output to the axle shafts 46 to provide propulsive power to the left and right rear wheels 24a and 24b (FIG. 1).

Figure 7:
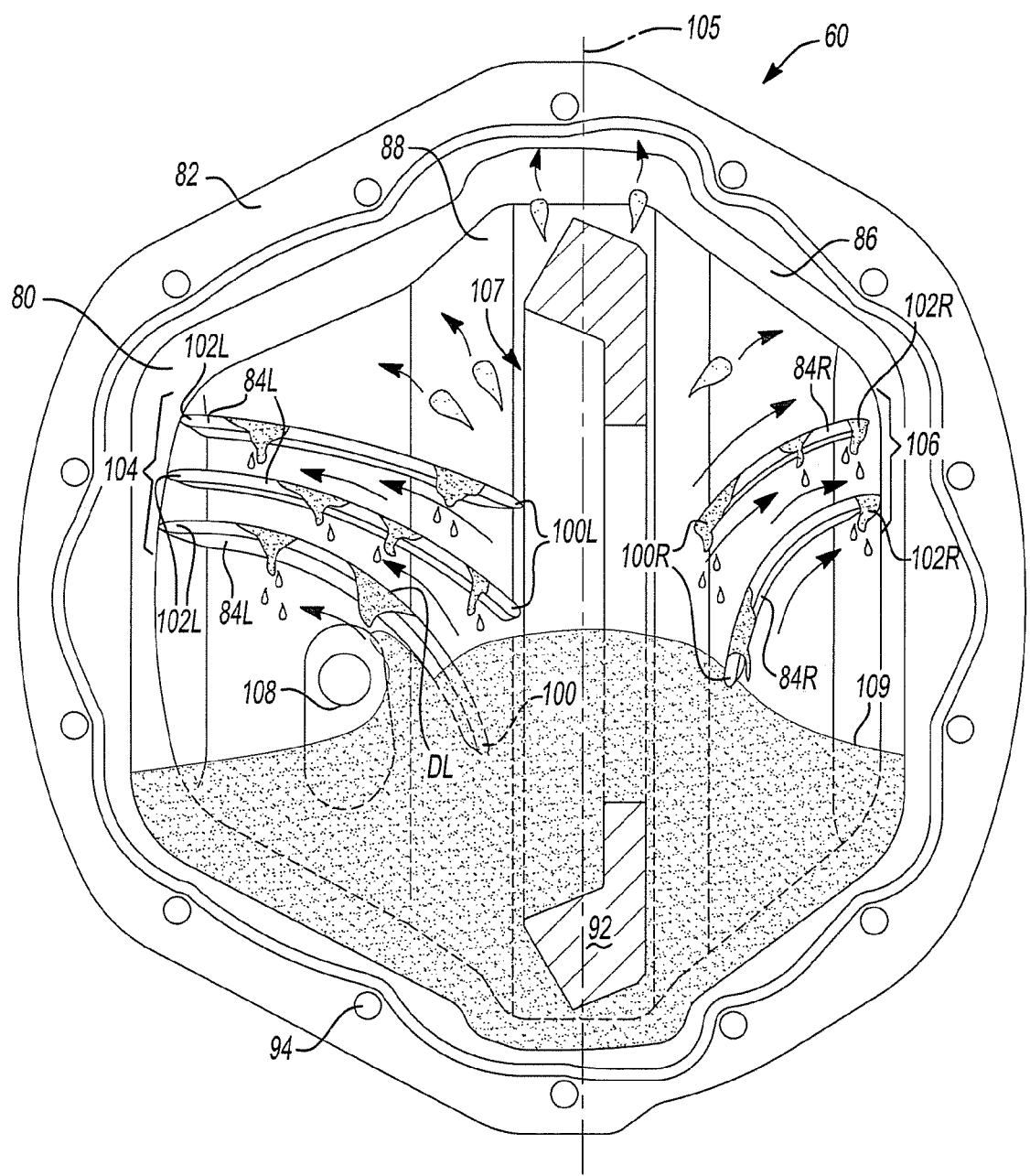
FIG. 7 is a sectional view of the axle assembly illustrating a rotating condition of the ring gear.

With particular reference now to FIG. 5, lubricant L can collect in the sump 64 and define a lubricant level 111 when the differential 42 is not in operation and the ring gear 92 is not rotating. Notably, the lubricant level 111 is equal to the static lubricant level 109. With reference to FIGS. 6 and 7, the ring gear 92 can be partially submerged in the lubricant L collected in the sump 64 and can circulate the lubricant within the internal cavity 62 as the ring gear 92 rotates in the direction of arrow A. Rotation of the ring gear 92 through the lubricant L in the sump 64 can push or drive a portion of the lubricant L generally toward the cover 60 and create a surge in the lubricant level 111 at the cover 60, particularly during lower vehicle speeds and/or lower outside temperatures. Some of the first ends 100 of the ribs 84 of the first and second groups 104, 106, which are generally disposed near the lubricant surge area S, can separate and divert a portion DL of the upwardly surging lubricant onto the ribs 84. The upward momentum of the diverted lubricant DL can cause the diverted lubricant DL to follow the path of the ribs 84 (flow channel(s) defined by the ribs 84) so that the diverted lubricant DL is moved outward from the recess 88 and toward the bearing journals 66 (FIG. 3) to enhance the overall flow of the lubricant L around the internal cavity 62. In addition, the ribs 84 can prolong contact between the lubricant L and the cover 60 to improve heat transfer therebetween and more effectively draw heat from the lubricant L.

The space or fluid path 107 between the first and second groups 104, 106 of ribs 84 can permit some of the upwardly accelerated lubricant to avoid the ribs 84, thereby permitting the ring gear 92 to sling sufficient amounts of the (un-diverted) lubricant L toward other components of the differential 42 in a conventional manner.

While specific examples have been described in the specification and illustrated in the drawings, it will be understood by those of ordinary skill in the art that various changes may be made and equivalents may be substituted for elements thereof without departing from the scope of the present disclosure as defined in the claims. For example, while the axle assembly of the particular example illustrated in the drawings and described is a Salisbury axle assembly, those of ordinary skill in the art will appreciate that the teachings of the present disclosure have application to other types of axle assemblies, such as banjo axle assemblies. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:
an axle housing assembly including a housing structure and a cover that is coupled to the housing structure, the axle housing assembly having an interior cavity with a sump having a static liquid lubricant level; and
a differential mounted in the axle housing assembly for rotation about a first axis, the differential including a ring gear,
wherein the cover includes an interior surface on which a first plurality of ribs and a second plurality of ribs are coupled, the first and second plurality of ribs extending into the interior cavity on opposite sides of the ring gear, each rib having a first end disposed proximate the ring gear and a second end further from the ring gear extending generally upwardly and outwardly from the first end, wherein the first end of at least one of the ribs lies below the static liquid lubricant level to thereby be immersed when a liquid lubricant fills the sump to a level that coincides with the static liquid lubricant level.

2. The axle assembly of claim 1, wherein the second ends of consecutive ribs extend generally parallel to each other.

3. The axle assembly of claim 2, wherein the second ends are generally evenly spaced apart.

4. The axle assembly of claim 1, wherein the first ends diverge while extending toward the ring gear.

5. The axle assembly of claim 4, wherein at least one of the first ends is generally linear.

6. The axle assembly of claim 4, wherein at least one of the first ends is arcuate.

7. The axle assembly of claim 4, wherein a lowermost first end is arcuate and subsequent first ends are increasingly less arcuate.

8. The axle assembly of claim 1, wherein the ring gear defines a plane extending therethrough and the first end of a lowermost rib extends at a generally acute angle relative to the plane.

9. The axle assembly of claim 8, wherein the first end of the lowermost rib extends below the static liquid lubricant level.

10. The axle assembly of claim 1, wherein the first plurality of ribs includes a different quantity of ribs than the second plurality of ribs.

11. The axle assembly of claim 10, wherein the first plurality of ribs includes three ribs.

12. The axle assembly of claim 1, wherein the first end of a lowermost rib is farther away from the ring gear than the first end of an adjacent rib.

13. The axle assembly of claim 1, wherein the cover further includes a recess formed in the interior surface, the recess having a bottom surface and a transition portion that connects the bottom surface to the interior surface.

14. The axle assembly of claim 13, wherein the first ends of the ribs are disposed on the transition portion.

15. The axle assembly of claim 14, wherein the second ends of the ribs are disposed on the transition portion.

16. The axle assembly of claim 1, wherein at least one of the first and second plurality of ribs are formed on the cover.

17. An axle assembly comprising:
an axle housing assembly including a housing structure and a cover that is coupled to the housing structure, the axle housing assembly having an interior cavity with a sump having a static liquid lubricant level and the cover having an interior surface defining a portion of the cavity;
a differential mounted in the axle housing assembly for rotation about a first axis, the differential including a ring gear; and
a first and a second set of ribs coupled to the cover, each of the first and second sets of ribs being disposed on opposite sides of the ring gear and including a plurality of spaced-apart ribs, each of the ribs extending generally upwardly and outwardly and having
a first end that is disposed proximate the ring gear, and
a second end further from the ring gear than an associated one of the first ends,
wherein at least one of the first ends is arcuate and extends below the static liquid lubricant level to thereby be immersed when a liquid lubricant fills the sump to a level that coincides with the static liquid lubricant level, the first end extending at a generally acute angle relative to a plane extending through the ring gear,
wherein the second ends of the respective ribs of the respective first and second sets extend generally parallel to each other and the first ends of the respective ribs of the respective first and second sets diverge while extending toward the ring gear.

18. The axle assembly of claim 17, wherein a lowermost rib of one of the first and second sets of ribs includes the at least one first end extending below the static liquid lubricant level.

19. The axle assembly of claim 17, wherein the cover further includes a recess formed in the interior surface having a bottom surface and a transition portion that connects the bottom surface to the interior surface, the first end of the ribs being disposed on the transition portion.

20. The axle assembly of claim 19, wherein the second end of the ribs is disposed on the transition portion.

\* \* \* \* \*